United States Patent
Young et al.

(10) Patent No.: US 6,634,864 B1
(45) Date of Patent: Oct. 21, 2003

(54) HIGH FLUID FLOW AND PRESSURE IN A CAPILLARY PUMP FOR VAPORIZATION OF LIQUID

(75) Inventors: Thomas M. Young, Richmond, CA (US); Mark Richardson, San Francisco, CA (US); Robert A. Lerner, Berkley, CA (US)

(73) Assignee: Vapore, Inc., Richmond, CA (US)

(*) Notice: Subject to any disclaimer, the term of this patent is extended or adjusted under 35 U.S.C. 154(b) by 44 days.

(21) Appl. No.: 10/079,744

(22) Filed: Feb. 19, 2002

(51) Int. Cl.[7] .............................. F04B 19/24; F15C 1/06
(52) U.S. Cl. ........................ 417/208; 417/207; 137/833
(58) Field of Search ................................ 417/207, 208; 137/828, 833, 825

(56) References Cited

U.S. PATENT DOCUMENTS

| | | | |
|---|---|---|---|
| 1,225,381 A | * 5/1917 | Wedge ........................ 431/328 |
| 3,262,290 A | 7/1966 | Huber |
| 3,688,083 A | * 8/1972 | Rice et al. .................. 392/488 |
| 3,869,242 A | 3/1975 | Schtaditz |
| 4,365,952 A | 12/1982 | Ohmukai et al. |
| 4,470,759 A | * 9/1984 | Kosson ........................ 417/208 |
| 4,552,124 A | 11/1985 | Nakajima |
| 4,571,481 A | 2/1986 | Leary |
| 4,684,341 A | 8/1987 | Kawamura et al. |
| 4,857,421 A | 8/1989 | Ernst ........................... 429/104 |
| 5,039,351 A | 8/1991 | Cooper et al. ............... 136/202 |
| 5,113,478 A | 5/1992 | Nakashima et al. |
| 5,228,922 A | 7/1993 | Sievers ........................ 136/202 |
| 5,267,584 A | * 12/1993 | Smith ............................ 137/13 |
| 5,405,262 A | * 4/1995 | Appel ......................... 431/320 |
| 5,692,095 A | 11/1997 | Young |
| 5,870,525 A | 2/1999 | Young |
| 5,928,436 A | 7/1999 | Borkowski et al. .......... 136/205 |
| 5,929,371 A | 7/1999 | Svedberg et al. ............ 136/204 |
| 5,939,666 A | 8/1999 | Sievers et al. ............... 136/205 |
| 5,998,728 A | 12/1999 | Sievers et al. ............... 136/205 |
| 6,162,046 A | 12/2000 | Young et al. |
| 6,347,936 B1 | 2/2002 | Young et al. |

FOREIGN PATENT DOCUMENTS

JP 4-24490 * 1/1992 ........... F28D/15/02

OTHER PUBLICATIONS

Allports CFB Technology Website pages; http://www.telo.com (Feb. 21, 2000).

Androff, Nancy Wara et al., "Macroporous Ceramics from Ceramic–Polymer Dispersion Methods," *AIChE Journal*, vol. 43, No. 11A, pp. 2878–2888 (1997).

van Bommel, M.J. et al., "Drying of Silica Gels with Supercritical Carbon Dioxide," *Journal of Materials Science*, vol. 29, pp. 943–948 (1994).

Miaoulis, Ioannis N. et al., "Thermal Energy Storage with Reversible Hydration of Lithium Bromide," HTD vol. 206–2, *Topics in Heat Transfer*—vol. 2, pp. 125–129.

* cited by examiner

Primary Examiner—Charles G. Freay
Assistant Examiner—Timothy P. Solak
(74) Attorney, Agent, or Firm—Ann W. Speckman; Lisa Benado (57) ABSTRACT

A capillary pump is provided for producing pressurized vapor emissions, having various layers that assist in creating optimal conditions to accomplish a high maximum fluid flow rate and pressurization. Heat and liquid/vapor flows in opposing directions in pathways within the layers. The pump includes a vaporization layer having small-sized pores and with a thickness and area to reduce viscous drag of flowing liquid and vapor. An ejection layer is also included having one or more openings and an integrated heat transfer portion for conveying heat and providing a low fluidic drag area. The pump may include an insulation layer to shield the liquid in a supply area from heat and/or a preheat layer to raise the temperature of the liquid prior to the liquid entering the vaporization layer. A coating at least partially surrounds the outer surfaces of the pump to allow vapor pressure to increase.

31 Claims, 6 Drawing Sheets

HIGH FLUID FLOW AND PRESSURE IN A CAPILLARY PUMP FOR VAPORIZATION OF LIQUID

FIELD OF THE INVENTION

The present invention relates to vaporization and pressurization of liquid in a capillary pump, and relates particularly to mechanisms for optimizing fluid flow and pressure for vaporizing liquid traveling through multiple layers of a capillary pump.

BACKGROUND

Many applications utilize the gaseous form of a liquid. Vaporization devices have been designed to vaporize liquids and release the resulting vapor under pressure. In general, liquid that is supplied to the vaporization device becomes vaporized as it flows through the various device components. In applications in which a pressurized vapor stream is desired, prior devices usually require that liquid be supplied to the device under pressure or that the vapor be otherwise pressurized by external means. For example, in order to sustain the inflow of liquid in a pressurized boiler system, the liquid is usually supplied under at least as much pressure as that of the outgoing vapor. However, such pressurized liquid sources are usually inconvenient to use, heavy to transport, explosive, and prone to leakage through added valves. Often it is desirable to provide liquid from a non-pressurized liquid source.

Fluid flow in these vaporization devices may occur in various pathways of the device, such as through pores or channels extending through device components. Some current vaporization devices that use non-pressurized liquid supplies, utilize capillary flow to draw the liquid. Although flow by capillary action is relatively simple, it presents some difficult problems in optimizing vapor production and release.

In order create favorable conditions for vapor production, the flow of fluids through the vaporization device should be maximized. In general, a higher flow rate permits more liquid to be vaporized per unit of time. However, at the same time it is also important for vapor pressure to increase within the device so that the vapor may be released with a certain amount of force. For example, in combustion applications, vapor emitted under pressure allows for mixing of the vapor with air or oxygenated gas so that the vaporized fuel/gas mixture may be burned. Vapor that is released under high pressure has a high Reynolds number, resulting in turbulence and therefore more rapid mixing. Consequently, a hotter and cleaner-burning flame may be produced when the mixed vapor is ignited. In efforts to create sufficient pressure to make a clean-burning flame, many prior devices have been designed to be large and bulky. These cumbersome devices are often overly costly and are inconvenient for varied applications.

Thus, it is important for a capillary pump to have both high fluid flow and produce high pressure in a simple and compact device. The maximum flow rate, i.e. the most liquid flow capacity for a device per unit time, and pressure are often related. Where the maximum flow rate within a device is low, this is often due to a correlated pressure drop within the device. For example, viscous drag within the capillary structures of many vaporization devices leads to a reduction in maximum flow rate as well as a drop in pressure. Moreover, the problem of reduced fluid flow is accentuated in devices that. include small capillary pores. Although small pores may increase the capillary pressure, the viscous drag increases to a larger extent, resulting in less flow of liquid. Thus, these prior devices have limited flow capacity of vapor and liquid.

In addition, some vaporization devices attempt to address other vaporization issues at the compromise of flow rate and pressure. For instance, it is essential that supply liquid be protected from heat exposure in the device. Where the supply liquid becomes heated, vaporization may occur in the supply, which is accompanied by uncontrolled pressurization of the supply liquid. The resulting vaporization may be a safety hazard. In response, some prior devices use a very thick capillary component that serves multiple functions for the device, such as insulating the supply liquid, as well as providing capillary action and a controlled place for travelling liquid to become heated. However, this increased thickness of the capillary component creates a longer distance through which the fluid must flow and be subject to viscous drag within the capillaries. Thus, this thick component needlessly reduces the rate in which fluid travels through the device.

One way of controlling the rate of vaporization is by adjusting the heat supplied to the device. At times, an electrically powered heater may supply the energy to vaporize the fuel and the electrical power input may be varied. These heaters are usually intricate and expensive. It is advantageous to incorporate simple heating mechanisms within the device.

The optimization of vaporization of the device is further effected by varied heat distribution within a horizontal cross-sectional area of the device in the pathway for fluid flow. Where the device has a point that is lower in temperature than another point along a horizontal plane, the rate of vaporization at that point is also lower, thereby decreasing the effective cross-sectional area of the evaporating surface and increasing total viscous drag in the device. Thus, it is desirable to maintain even horizontal heat distribution within the device.

In general, the shortcomings of the current vaporization devices encompass thick multi-purpose components, which decrease the maximum fluid flow and pressurization of the devices. Furthermore, previous vaporization devices are often bulky, expensive and inconvenient for varied applications.

SUMMARY

A capillary pump is provided for producing pressurized vapor emissions, which has layers that have varying properties and characteristics to serve different functions in creating optimal conditions to accomplish a high maximum fluid flow rate and pressurization. The layers create fluid pathways for heat and liquid/vapor to flow in opposing directions. One such layer is a vaporization layer sufficiently thin and encompassing an adequate area to reduce viscous drag of flowing liquid and vapor. The vaporization layer has small-sized pores to produce the capillary pressure necessary to draw the liquid through the layers of the device, as well as to support the pressurization of the resulting vapor. An ejection layer is also included having one or more openings to permit release of pressurized vapor. This ejection layer has an integrated heat transfer portion that has a plurality of pores or channels for conveying heat and providing a low fluidic drag area. A coating at least partially surrounds the outer surfaces of the pump to allow vapor pressure to increase.

In some embodiments, the pump additionally has a porous insulation layer to shield the liquid in the supply area from heat that may migrate through the thin vaporization layer. Furthermore, the capillary pump may include a porous preheat layer to raise the temperature of the liquid prior to the liquid entering the vaporization layer. In still further embodiments, a heat distribution layer may be included with smaller pores than the pores or channels of the heat transfer portion.

The ejection layer may have various configurations to assist in pump optimization. In one embodiment, the heat transfer region of the ejection layer may be formed by the space between multiple protruding posts. Furthermore, at least one of the opening(s) in the ejection layer may be a variable opening, such as a flexible plate with at least one slot or having a moveable plate that may at least partially uncover the opening. In further embodiments, the ejection layer may create the heat that is used in the vaporization region to create vapor. For example, the ejection layer may be integrated with a thick film electrical heater or comprise an electrically conductive material, or comprise a chemically reactive substance, e.g. lithium bromide, to create heat upon contact with an added substance, e.g. an aqueous solution, such as water.

The pump may be adapted for a variety of applications that require pressurized vapor. For combustion applications, the pump may incorporate or be associated with an energy converter to generate a flame from the released pressurized vapor. Such energy converter may include, for example, spark electrodes, glow wires, flint assemblies, or the like.

BRIEF DESCRIPTION OF THE DRAWINGS

The present invention is illustrated by way of example in the figures of the accompanying drawings and the figures are not intended for limitation, in which.

DETAILED DESCRIPTION

A stacked capillary pump for producing pressurized vapor emissions is provided. The capillary pump includes multiple layers that each serve different functions in creating optimal conditions to achieve overall a high maximum fluid flow rate and pressurization. A vaporization layer is included that has small-sized pores to produce the capillary pressure necessary to draw the liquid through the layers of the device as well as to support the pressurization of the resulting vapor. The vaporization layer is sufficiently thin and encompasses an adequate area to reduce viscous drag of flowing liquid and vapor. An ejection layer is also included having one or more openings to permit release of pressurized vapor. This ejection layer has a porous and/or channeled heat transfer portion that is proximal to the vaporization layer for conveying heat toward the vaporization layer. This heat transfer portion also provides a low drag porous and/or channeled area in which vapor may find its way to the opening. The pump is at least partially surrounded by a coating to block fluid leakage and allow vapor pressure to increase.

In some embodiments, in order to shield the liquid in the supply area from heat that may migrate through the thin vaporization layer, the pump additionally has a porous insulation layer. Oftentimes with the use of a separate insulation layer, the vaporization layer need not be thick in size in order to insulate the supply liquid. Furthermore, the capillary pump may include a porous preheat layer to raise the temperature of the liquid prior to the liquid entering the vaporization layer. With use of the preheat layer, the heated liquid has less viscous drag within the vaporization layer to facilitate the flow of liquid through the capillaries.

Figure 1:
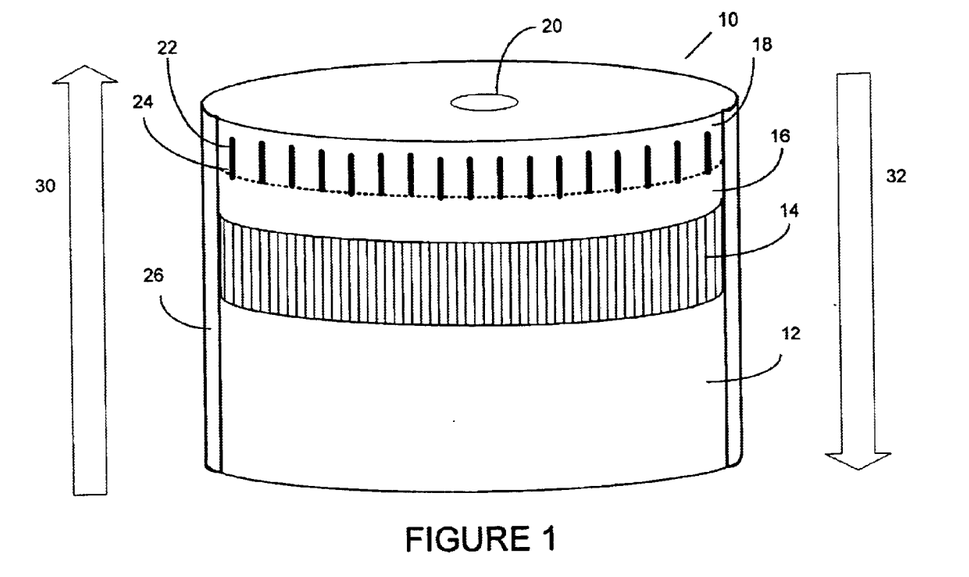
FIG. 1 is a schematic cross-sectional diagram illustrating a capillary pump of the present invention having an insulation layer, according to one embodiment of the present invention.

The layered capillary pump 10 is depicted in FIG. 1 as one embodiment of the present invention. A fluid flow pathway for liquid and vapor to travel is provided through multiple layers of the pump, each layer having varying porosity and thermal conductivity. Capillary pump 10 comprises, in the direction of the fluid flow pathway 30, an optional liquid supply layer 12 to provide liquid to other layers of the pump, an insulation layer 14 to protect the supply liquid, e.g. in the liquid supply layer 12, from heat present in a relatively thin vaporization layer 16, and an ejection layer 18 to permit vapor produced by the vaporization layer 16 to be released. At least the vaporization layer 16 has permeability to liquids and vapors due to its connected porosity and is sealed at its peripheral edges by coating 26, which is substantially impervious to liquids and vapors. Heat is transported in a direction of a heat flow pathway 32 from the ejection layer towards the supply liquid creating a thermal gradient within pump layers, with the highest temperature areas being in proximity to ejection layer 18 and the coolest areas being in proximity to liquid supply layer 12.

The layers may be sufficiently aligned to create a fluid flow pathway for the liquid and vapor to travel in the capillary pump and the surfaces of the layers may be in close proximity to one another, and may be in contact with one another. Each of the layer surfaces may closely contact the adjacent layer surface substantially without gaps or voids. Each layer may have the same or different shape and size. Usually the thickness of the various elements depends on the function that the layer provides. In addition to the layers described, other layers may be added, and are within the intended scope of the invention. Furthermore, the capillary pump of the present invention may include one or more of the layers described herein and arranged in various orders.

The capillary pump may vaporize any type of liquid that may be vaporized under suitable conditions, e.g. attainable heat of vaporization and boiling point. For example, some liquid fuels include gasoline, white gas, diesel fuel, kerosene, JP8, alcohol such as ethanol and isopropanol, biodiesel, and combinations of liquid fuels. Other liquids may include fragrance compounds or other liquids for which vaporization is desired, or as a means to precisely meter a vapor component, as might be incorporated into a production process.

Liquid may be provided to the pump layers via one or more liquid supply layer 12. In one embodiment, the liquid supply layer 12 is composed of a large pored capillary material and have a high thermal conductivity, so as to provide the liquid at a constant temperature. The pore diameter depends upon, inter alia, the materials employed and the general pump configuration. An average pore diameter of from about 5 to 150µ may be generally suitable, and average pore diameter of from about 25 to 75µ may be more typical. Some high porosity materials that may be used for the liquid supply layer include ceramics, such as alumina grindstone material (as provided, for example, by Abrasives Unlimited Inc., located in San Leandro, Calif.). Also, numerous absorbent, porous materials (such as NOMEX™ from E.I. duPont de Nemours & Co., located in Wilmington, Del.) including cotton, fiberglass, and the like, that are known in the art may be appropriate. Many absorbent porous materials that may be used tend to stretch to a greater degree in one direction than in others. The low stretch direction of such materials may be aligned with the longitudinal axis of the liquid supply layer. The dimensions and placement of liquid feed layer are such that fuel is absorbed and conveyed to the capillary pump regardless of the level of liquid fuel in a supply reservoir. The liquid supply member 12 may be brought into communication with free liquid of a reservoir by means of contact with a fabric wick material, such as cotton, fiberglass, and other materials that are generally know to those familiar with the art.

Oftentimes, the liquid is provided at general ambient temperatures and/or pressures. In addition to a capillary-type liquid supply layer, other kinds of supply layers may be provided using different mechanism to convey liquid, such as a gravity-fed system or other such systems may transport liquid from a liquid source, e.g. a reservoir, to the liquid feed surface of the pump layers.

The liquid supply layer may be provided as an integral component of the capillary pump for certain applications. The supply layer is typically at a position far away from the ejection layer 18. In other embodiments, the liquid supply layer is not provided in the capillary pump, and liquid is delivered directly to the capillary pump through an external means. For instance, a portion of the pump may be directly submerged into a liquid source, obviating the need for the liquid supply layer.

Some embodiments of the capillary pump also include an insulation layer 14 proximal to the supply liquid. The insulation layer 14 is positioned between the liquid supply layer, or a liquid source where the liquid supply layer is not provided, and next adjacent layer of the pump along the fluid flow pathway. The insulation layer is composed of low thermal conducting material. It typically has large pores that create little viscous drag for liquid flowing there within, e.g. 5 to 100 microns or, more typically, 20 to 50 microns. Some examples of material that may comprise the insulation layer include zirconia and silica.

The dimensions, i.e. thickness and area, of insulation layer 14 are sufficient to protect the supply liquid from being heated to cause vaporization. The thickness of the insulation layer may depend on the minimum flow rate that is desired for the pump. The rate at which temperature decreases from the top to the bottom of the pump may be determined by the balance of liquid flow upward and the conduction of heat downward by the layers. The lower the rate of liquid flow upward, the greater the thickness necessary for the insulation layer. Thus, the thickness may be partially determined by the dynamic range of fluid flow desired for the pump.

In one embodiment, the vaporization and the insulation layers may be combined into a single layer by employing a porous material with a graded pore size distribution. In such a material, the pores vary in size as a function of distance within the layer from the top to the bottom, with the smaller pores being at the top. Such materials may be created by use of vapor-phase sintering of a porous ceramic material under conditions of a thermal gradient.

Figure 2:
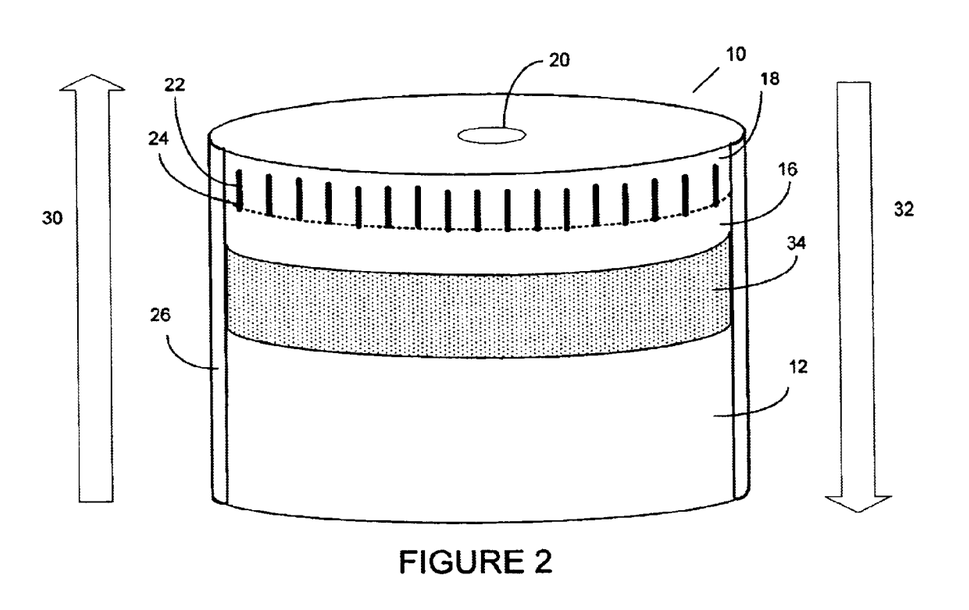
FIG. 2 is a schematic cross-sectional diagram illustrating a capillary pump of the present invention having a preheat layer, according to one embodiment of the present invention.

In some embodiments of the present invention, a preheat layer 34 is included in the capillary pump 10, as shown in FIG. 2. Heat may also be added to the preheat layer from external sources and communicated to the preheat layer, such as through the sides of that layer and through the coating. This lateral heat application may be either in addition or to the exclusion of the application of heat to the ejection layer.

The preheat layer 34 warms the liquid flowing along the liquid flow path prior to the liquid reaching the vaporization layer 16. The warming of the liquid reduces the viscous drag in the capillaries of the vaporization layer, thus increasing the maximum fluid flow of the pump. The preheat layer usually has large pores and is highly thermally conductive. The thickness of the preheat layer as well as the material comprising the layer may be chosen to create a high temperature, e.g. boiling point, in the liquid by the time the liquid contacts the vaporization layer.

In some embodiments, the capillary pump includes both an insulation layer and preheat layer to facilitate high fluid flow and pressure. In other embodiments, either the insulation layer or the preheat layer is present. In any case, the presence of either or both layers allows a thin vaporization layer to be provided.

One or more vaporization layers 16 are provided that have small pores to create high capillary pressure for the liquid traveling in the pump and have a thickness and area sufficient to reduce overall viscous drag of flowing liquid in the layer induced by the liquid traveling in the small pores. Vaporization layer 16 may be provided in a variety of shapes and configurations. The vaporization layer of the present invention is relatively thin in size, such as between about 0.01 to 10 mm and more typically, 0.10 to 3.0 mm and most often 0.20 to 1.0 mm. The area may be various sizes, such as between 0.01 and 100 square centimeters, more typically between 0.10 and 25 square centimeters, and most often between 0.25 and 10 square centimeters.

The pores of the vaporization layer are at least substantially uniform in size and provide small open structures for the fluid flow pathway. The pore size of vaporization layer 16 is sufficiently small to provide adequate capillary pressure to produce the desired pressure and vapor output rate and pressure. For example, an average pore size may be in a range from less than 0.01 micron to about 50.0 microns, and from 0.05 to 10 microns is more typical, and about 0.10 to 2.0 microns is especially typical. The pore size may be smaller where it is desirable to generate greater capillary pressures and, consequently, higher evolved vapor pressures. The pore size typically remains substantially constant during operation of the capillary pump. The vaporization layer may also have any amount of porosity to produce the desired volume of vapor and rate of vaporization. A percentage porosity from about 45% to 90% is typical for the vaporization layer and more often between 60% to 80%.

In general, the higher porosity in any given layer may decrease the viscous drag experienced by fluids traveling through a layer. Also, higher porosity may decrease the thermal conductivity of the layer. As a result, the rate of vaporization and volume of vapor may be affected.

The vaporization layer usually comprises a low thermal conductivity material to maintain a thermal gradient along the liquid flow pathway in the vaporization layer and to prevent substantial heat loss from the layer. Materials having a thermal conductivity of less than about 10 W/m K are often suitable for vaporization layer 16, materials having a thermal conductivity of less than about 1.0 W/m K are typical, and materials having a thermal conductivity of less than about 0.10 W/m K are often used. Such materials include ceramic material, such as zirconia, e.g. unstabilized zirconia that becomes stable during processing, stabilized zirconia (PSZ), tetragonal zirconia (TTZ), and zirconia ceramics stabilized with yttria, magnesia, ceria or calcia, or a combination of stabilizing materials, and other ceramics having low thermal conductivity. Other materials include glass, fibrous materials such as fiberglass mats, other types of woven and non-woven fibrous materials (such as filters distributed by Millipore Corporation, located in Bedford, Mass., as APFC 090 50 and having a pore size of $1.2\mu$). In other embodiments, the vaporization layer 16 may comprise a composite member composed of materials having different pore sizes and/or thermal conductivities at various locations in the vaporization layer.

Where an insulation layer is provided in association with the vaporization layer to prevent pressurization of the supply liquid, a highly thermally conductive vaporization layer may be advantageous in order to maximize the temperature of the liquid in the layer and thereby minimize the viscosity, resulting viscous drag, and liquid pressure drop in the layer. A high-conductivity vaporization layer may also decrease temperature variations along the horizontal plane at the evaporation level, thereby increasing the effective area of the evaporation layer.

The vaporization of the liquid occurs at least substantially at a vaporization region 24 in which the temperature is at the vaporization temperature for the liquid. The vaporization region 24 may be along the surface of the vaporization layer that is farthest away from the supply liquid along the fluid flow pathway. In the alternative, the vaporization region may be located at other points within the vaporization layer and usually resides in a horizontal plane. Typically, the location of the vaporization region may be stabilized through counter balance of heat and vapor accumulation pressing in the direction of the heat flow path and the liquid traveling along the liquid flow path.

The capillary pump also includes an ejection layer 18 comprising one or more opening(s) 20 that penetrate the thickness of the plate for vapor emission from the capillary pump. The ejection layer is often at least substantially impermeable to liquids and vapors. In particular, the ejection layer may comprise ceramic materials comprising a mixture of alumina and glass, such as alumina with a glass sintering aid.

The opening 20 is a sufficient size to permit egress of one or more vapor stream(s) under pressure. In some embodiments, the opening may be fixed in size. In one embodiment, the opening has a larger diameter portion that tapers to form a smaller diameter portion from which the vapor is released. Such a tapered opening may assist in forming a jet of vapor. However, in other some embodiments, the opening size may vary with changing conditions. The size of the opening may depend on the dynamic range of flow desired from the pump. The non-linear nature of the vapor pressurization and the flow rate means that an opening size selected to produce adequate pressurization for the maximum flow required of the pump may not produce sufficient pressurization, and therefore Reynolds Number, to cause turbulence in the vapor jet for the lowest flow desired from the pump. With a variable opening size, as the fluid flow rate increases within the pump, such as with the application of more heat, the vapor pressure also increases, and usually in a non-linear manner. As a result, the maximum flow rate of the device may become limited. In general, the maximum flow rate of a pump may be determined by the relationship between at least the following factors: (1) the total liquid viscous pressure drop as it travels from the supply to the point of evaporation; (2) the vapor viscous pressure drop as it travels from the point of evaporation to the orifice; (3) the vapor pressurization determined by the size of the orifice; and (4) the maximum capillary pressure determined by the size of the pores in the vaporization layer. The first three factors increase as flow is increased and the fourth factor remains fixed. When the arithmetic sum of the first three flows is equal to the fourth, the maximum flow may be generally attained.

Although a larger orifice may be provided to decrease the internal excessive pressure, the pressure at which vapor is release may be too low for some applications. For example, the pressure may be inadequate for sufficient mixing in combustion purposes. One or more variable opening(s) permit the size to be changed in response to changing internal pressure.

Figure 3:
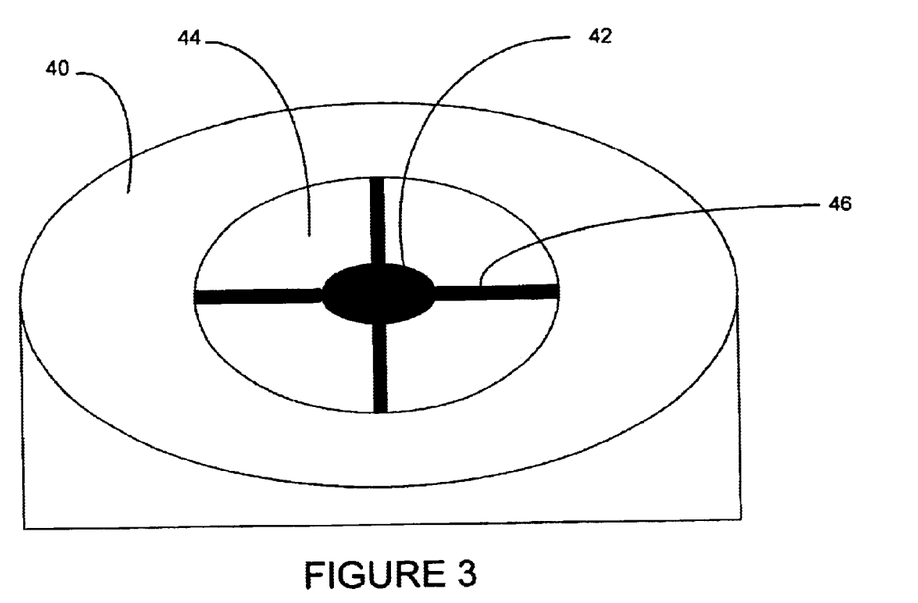
FIG. 3 is the top view of one embodiment of an ejection layer with a slotted flexible plate.

One such variable opening 40 is depicted in FIG. 3 with a radially-slotted opening 42 in a flexible plate 44. The opening has one or more slots 46 extending from the opening 42. A large opening is provided at high flow rates and small opening occurs when the flexible plate is relaxed at low flow rate. The opening expands as vapor flow increases by vapor pressing against the opening edges and the plate flexing outwards, thus increasing the effective area of the opening. This expanded opening may decrease the internal vapor pressure at high flows and increases the dynamic range of flow.

Figure 4:
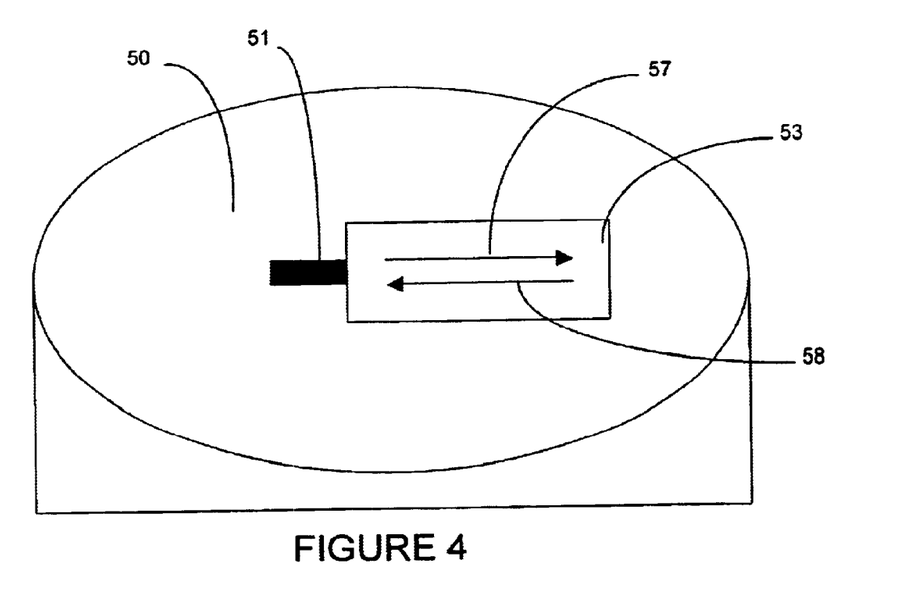
FIG. 4 is the top view of one embodiment of an ejection layer with a moveable plate.

In another embodiment of variable opening 50 shown in FIG. 4, one or more openings 51 of equal or different sizes are provided and at least partially covered by a moveable plate 53. The plate may be moved, such as by mechanical means, in a release direction 57 to uncover more of the area of the opening as flow increases and in a closed direction 58 to cover more of the area where flow decreases. In one embodiment, the plate and/or opening may be of an irregular shape in order to optimize control of flow.

The capillary pump further includes as integrated part of the ejection layer, a porous or channeled heat transfer portion 22 located proximal to the vaporization layer to convey heat toward the vaporization layer. Usually, the heat transfer portion 22 comprises high thermal conductivity material. Often, the heat transfer portion comprises an area of large pores or channels that are typically relatively uniform in size, and that may assist in creating a low viscous drag pathway for the vapor to travel to the opening 20. An example of the large pore diameter is about $250\mu$. In some embodiments, the heat transfer portion may include multiple posts that protrude towards the vaporization layer, slots, grooves, or the like to form the plurality of pores or channels. The heat transfer portion may encompass much of the ejection layer, such as half of the vertical or axial length of the ejection layer. The pore or channel space, e.g. space between the posts, may serve as a collection area for vapor to collect. At times, at least some liquid vaporization also takes place within the heat transfer portion, as well as in the vaporization layer.

The generally high thermal conductivity of heat transfer region is sufficiently high to transfer the heat required for vaporization to the vaporization region of the vaporization layer without requiring an excessive temperature gradient. The thermal conductivity of at least much of the ejection layer 18 may be greater than about 15 W/m K, and more often greater than 40 W/m K. The heat transfer portion may be composed of any of a variety of materials. For example, high porosity ceramics and composite materials, such as alumina grindstone material (such as material from Abrasives Unlimited, Inc.) may be used. The heat transfer portion may be chemically milled or otherwise formed in the ejection layer.

The heat used by the capillary pump may come from numerous types of heat sources, located external or internal to the pump. In one embodiment an internal heat source, such as a resistive heating element electrically connected to a power source may be provided. A thick-film heater may be integrated with the ejection layer. In one embodiment, an electrically conductive element is printed directly onto the top surface of the ejection layer. For example, electrical connection pads may be in contact with the ejection layer, such as wrap around the outer sides of the ejection layer, and in some instances, also contacting other layers of the capillary pump. The pads may be in electrical communication with a power source. The connection may be through various transmission means, such as spring-loaded conductive fingers, soldered wires, etc. In other embodiments, the ejection layer comprises a material that is electrically conductive, e.g. silicon carbide or other such materials.

The heat source may also be supplied from the heat of combustion of the released vapor output and returned to the heat transfer member to provide the heat required for additional vaporization. The heat may be returned to the pump by a high-thermal-conductivity solid member, such as a metal strut, or a heat pipe, capillary pump loop, etc. For example, conductive elements may form a part of a burner component that is in thermal communication with a thermally conductive member. The thermally conductive member may be in proximity to the vaporization layer in order to transfer the heat energy necessary for fuel vaporization and pressurization from the burner to the vaporization layer. According to one embodiment, a steady state condition can be achieved and maintained wherein a portion of the heat generated in the burner is used to produce pressurized vapor, which in turn is used for combustion.

However, even with a returning heat source, the capillary pump must have a starting mechanism to initiate the heating and vaporization process. Some of the same mechanisms used to generate start-up heat may be applied to ignite the vapor output in some combustion applications. The startup may be provided by external means, such as a match. In addition, the pump may have an integrated or self-generating means to provide the startup heat. The start up heat may come from any number of chemical reactions both reversible and non-reversible. A non-reversible reaction includes the burning of fuel. A reversible reaction could be hydration of lithium bromide for heat and dehydration for regeneration and reuse.

Figure 5:
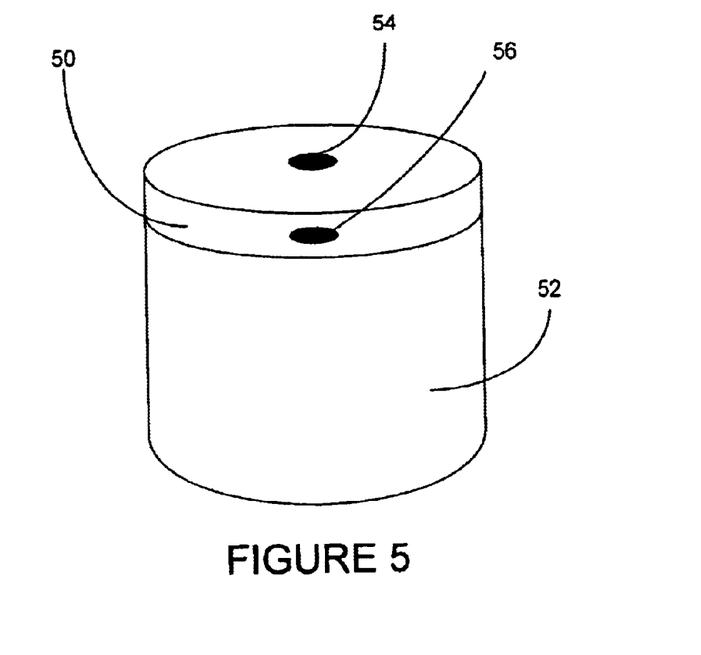
FIG. 5 is an exterior view of one embodiment of a capillary pump having a filling aperture for self-generating startup heat.

In one embodiment, the ejection layer may comprise a chemically reactive substance to create heat upon contact with an added substance. The reactive substance may be located throughout the ejection layer material, or may be positioned in specific areas that may be contacted with the added substance. For example, the outer surface of the ejection layer may include a catalytic material to generate the starting heat. As shown by an exterior view of a capillary pump 50 in FIG. 5, the reactive substance may also be located at or near a filling aperture 56 through which the added substance is poured. Thus, the ejection layer 52 may include an aperture 56 for contacting the added substance in addition to opening 54 for release of vapor. Such self-generating heat source may permit the starting heat to be at a lower and safer temperature.

In an example of the use of a reactive substance, the ejection layer may include lithium bromide, or another similar substance, and the added substance may be an aqueous substance, e.g. water. Upon contact with the water, the lithium bromide forms a hydrate in an exothermic chemical reaction and in the process, produces heat that may be use as the starting heat to initiate vaporization in the capillary pump. Furthermore, in combustion applications, the heat returned from burning the vapor may sustain continued vaporization as well as reverse the hydration reaction. As a result, the reactive substance, e.g. lithium bromide, may return to its initial state so that it may provide a new reaction and heat for the next startup cycle.

A catalytic reaction may also be employed to produce startup heat and/or vapor ignition. For example, a catalytic material may be incorporated into or proximally to the ejection layer. This material may catalyze an exothermic reaction with the capillary pump input fuel or another substance in order to produce startup heat and/or vapor ignition.

Friction heating may also be used for startup heat in addition to ignition of the pump. A friction wheel may be horizontal and flat against the top of the pump in order to provide a sufficient friction and heat transfer area.

Furthermore, a storage device, such as a battery, may be provided to store the electrical energy generated by the heat of combustion through the use of thermal-to-electric energy converters such as thermophotovoltaic, alkali metal thermal to electric conversion (AMTEC), fuel cell, or other such device for later return to the capillary pump and later use as startup heat. A battery may store electrical energy for use in an electrical heater to provide start up heat as well as energy to a spark generator or glow wire for ignition. In addition, the electrical power from this thermal-to-electric energy converter may be used in order to provide electrical power to an electrical heating device and to provide vaporization heat during normal operation of the capillary pump. This type of energy converter permits easy control over electrical power through simple circuit components.

The heat source may be capable of providing heat in a generally uniform distribution over a surface or cross section of vaporization layer 16. The heat sources described are by way of example and are not intended to limit the choices that are or may become available in the field of heaters to provide high temperatures for use by the vaporization layer.

The layers of the capillary pump is usually at least partially surrounded by a coating 26 to block fluid leakage. The confinement permits pressure to build within the pump. The coating 26 may be combined with an impermeable ejection layer 18, to substantially enclose the pump at its peripheral edges, except for the ejection layer opening. Usually, at least the vaporization layer is enclosed at its peripheral sides.

The coating may be in a variety of forms and made of many different materials, depending upon the configuration and composition of the layers and the environment or application of the capillary pump. For example, the coating may be a low thermal conductivity glaze, such as glass, that seals the peripheral edges and holds the various other pump layers in place. According to another embodiment, the coating is provided as shroud, such as stainless steel, titanium alloy, etc. Furthermore, in some embodiments, an area for introduction of the supply liquid, such as the liquid supply layer, is not enclosed by the coating. In any case, the coating provides sufficient containment of the pump to permit pressure to build within the pump by inhibiting the escape of liquid and vapor.

The generally low thermal conductivity of the coating is sufficiently low to prevent a substantial portion of thermal energy from migrating from the vaporization region toward liquid supply layer. The thermal conductivity of the coating may be less than about 2 watts per meter-Kelvin ("W/m K") and more often less than about 1 W/m K.

Figure 6:
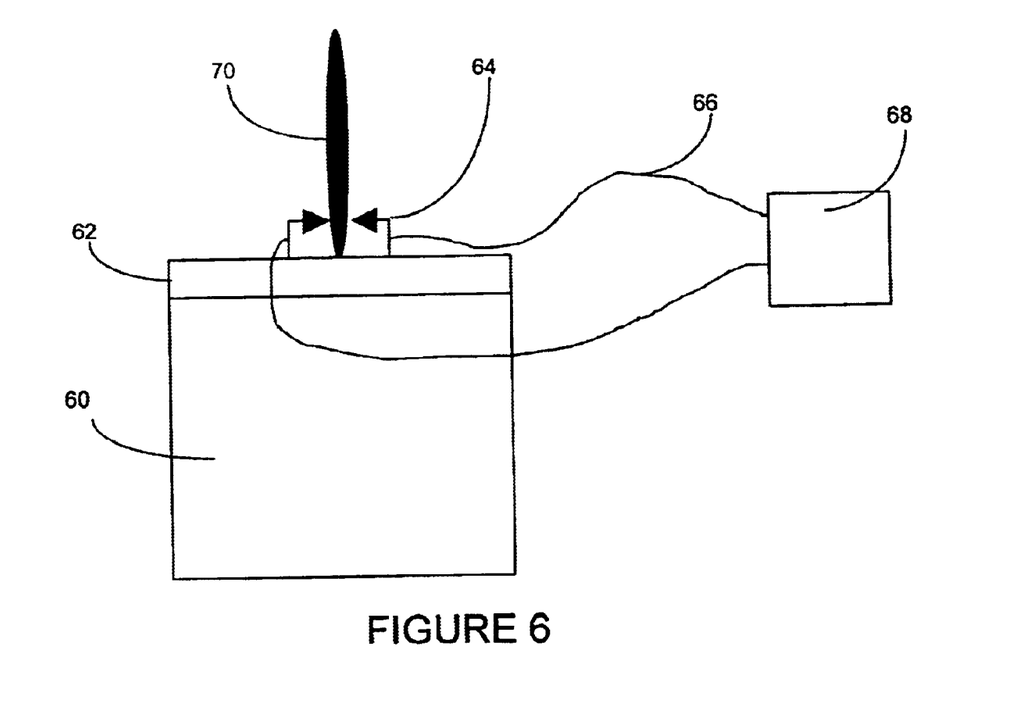
FIG. 6 is an exterior view of one embodiment of a capillary pump having an integrated electrical ignition system.

The capillary pump described above may include variations to adapt the pump to particular applications in which vapor may be used. For example, the vapor may be ignited to produce heat and/or fire. In this application, an ignition system is provided to create a flame from the vapor output. One type of ignition system converts mechanical or electrical energy into a spark, which ignites the vapor. As shown in the capillary pump 60 in FIG. 6, spark electrodes 64 may be incorporated into a heat return component 62 in communication with the pump 60, e.g. contacted with or mounted to a pump surface, such as the outer surface of the ejection layer. The spark electrode may be positioned proximal to the vapor output 70. Electrical conductors 66 may be provided to supply voltage to the spark electrodes 64 from an external voltage source 68. An example of a voltage source is a piezoelectric element that is compressed by mechanical, e.g. manual, force.

Figure 7:
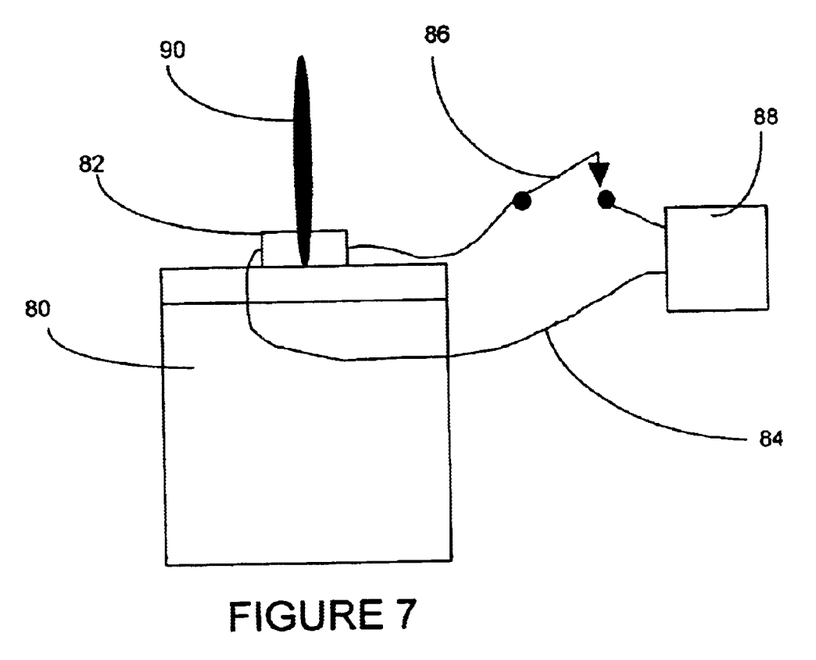
FIG. 7 is an exterior view of one embodiment of a capillary pump having an integrated electrical ignition system.

FIG. 7 shows a capillary pump 80 with another embodiment of an integrated ignition system, wherein a glow wire 82 may traverse the vapor output 90, e.g. above the ejection layer opening. Electrical conductors 84 are for providing power from an external power source, e.g. a battery. A switch 86 may be included to connect the power source 88 to the electrical conductors 84 and increase the temperature of the wires to ignite a flame.

Figure 8:
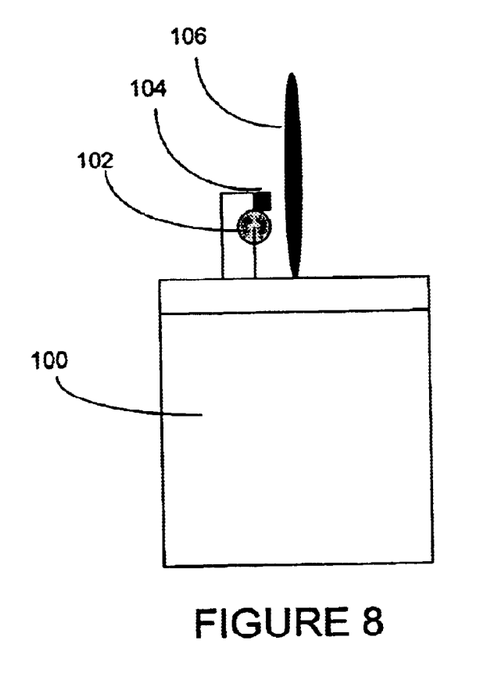
FIG. 8 is an exterior view of one embodiment of a capillary pump having an integrated electrical ignition system.

In addition, as shown in FIG. 8, a capillary pump 100 having still another embodiment of integrated ignition system may include an abrasive wheel 102 and flint 104 placed proximal to, e.g. adjacent to, the vapor-output 106. The wheel 102 may be rotated, such as by mechanical means, e.g. manual, to contact the flint 104 and produce a spark which may ignite a flame. Another embodiment may combine the frictional heat startup method described previously with the present method for ignition by use of a horizontal abrasive wheel in direct contact with the top surface of the ejection layer.

Figure 9:
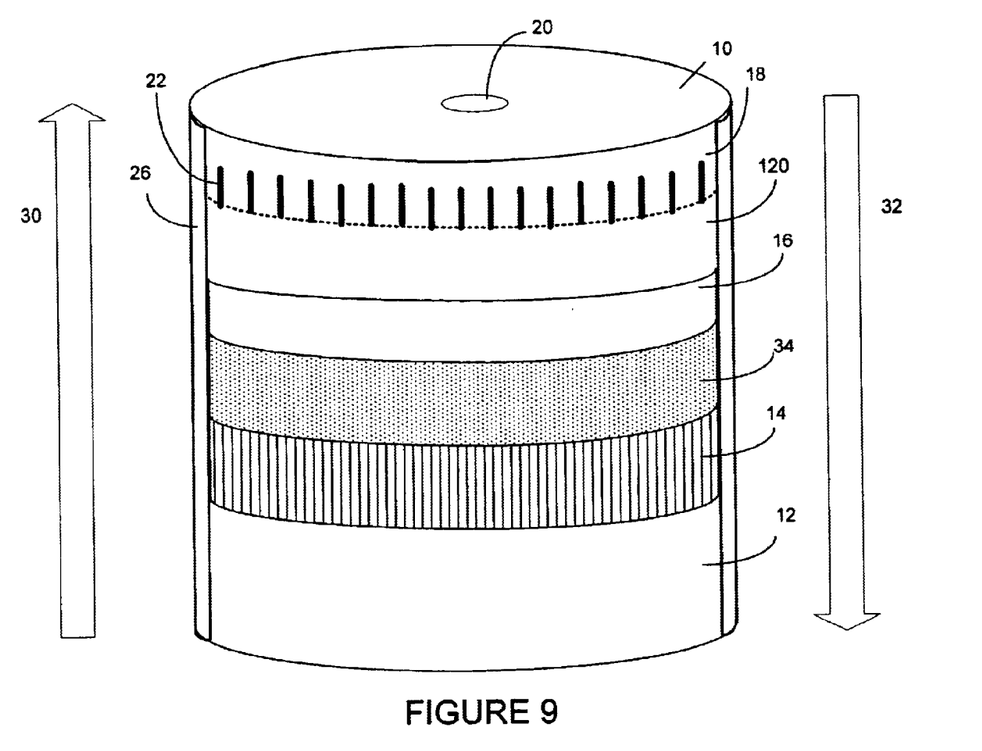
FIG. 9 is a cross-sectional representation of one embodiment of the pump layers including a temperature distribution layer.

In addition to the layers described above for the capillary pump, the present invention also anticipates that other layers may be substituted or added to further optimize fluid flow and pressure conditions. For example, in one embodiment of capillary pump 10 shown in FIG. 9 that includes a heat distribution layer 120 to provide a more even spread of heat for vaporization along a horizontal plane, as well an insulation layer 14 and preheat layer 16. The other layers in FIG. 9 are as described above with reference to FIGS. 1 and 2.

The heat distribution layer 120 is usually positioned between the ejection layer and vaporization layer. The heat distribution layer is comprised of pores that are smaller than the larger pores or channels of the heat transfer region of the ejection layer. For example, the pores of the heat distribution layer may be about 1–80$\mu$ and more usually between about 20–50$\mu$ and the pores of the heat transfer region being between about 250$\mu$.

Heat tends characteristically to concentrate near the periphery of the pores or channels of the heat transfer layer, such that near the center of a pore or channel is typically a lower temperature than at the perimeter of a pore. Where large pores or channels are provided, as with the heat transfer portion of the ejection layer, there is often a greater discrepancy in the distribution of heat. Any vaporization occurring in the area of such large pores or channels may be uneven and may result in a larger viscous liquid pressure drop developing in the vaporization layer. Thus, the small pores of the heat distribution layer facilitate even vaporization and the pump may support a higher maximum flow.

In some applications of the capillary pump, the pump may be associated with a burner component that may be mounted to or in proximity to the ejection layer. The burner component may have chamber(s) for mixing of air or another gas or mixture with the vapor. For example, air for mixing with the vaporized fuel may be provided at ambient temperature and pressure or, for particular applications, may be provided at an elevated temperature and/or pressure. The vapor mixture may exit the burner chamber and enter a combustion area. Various burner components known in the art may be employed.

Another alternative component that may be included in certain embodiments of a capillary pump is a vaporization layer holder to provide mechanical support for vaporization layer. Where the vaporization layer comprises a non-rigid material or a material that is prone to stretching or otherwise changing its conformation, the holder made of rigid material, such as sintered bronze, may be employed.

Figure 10:
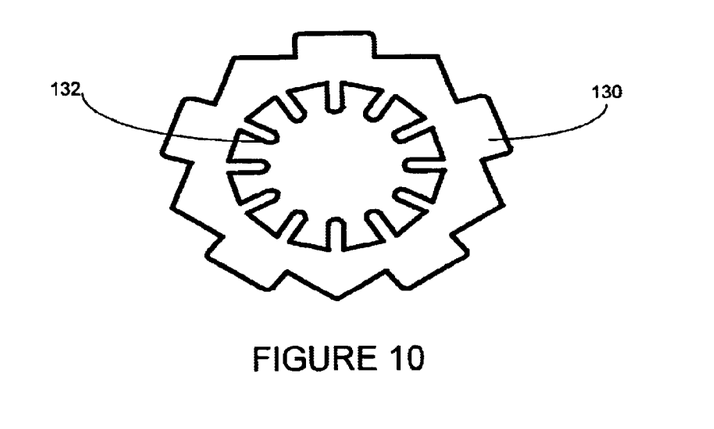
FIG. 10 is a top view of one embodiment of pump retainer for supporting the capillary pump.

A device that employs the capillary pump may include various components, e.g. capillary pump, burner, etc. that need to be mounted in place. One or more retainer components may be provided for this purpose. The retainer components are usually low thermally conductive. For example, in order to hold the capillary pump in association with other components of a device, a pump retainer may be used. One embodiment of a retainer 130 is shown in FIG. 10, having inside tabs 132 that may be spring loaded against the sides of the capillary pump. The retainer may be used as a low thermal conductance support structure. One method of making the retainer is by photo chemically etching a thin flat sheet of material, e.g. stainless steel, and folding it into the desired shape.

Other components that may be included in or in association with the pump may optimize pump performance or add safety of operation. For example a starter control may be added to restrict operation of the capillary pump, introduction of liquid or release of vapor. An emission control component, such as a throttle or valve, or the like, may be included to provide controllable vapor release from the capillary pump. The control component may provide sufficient constraint to pressurize vapor enclosed by the substantially vapor-impermeable coating.

Other mechanisms to control vapor output may be through adjusting the amount of heat supplied to the pump, changing the flow of liquid from the liquid supply layer or source, limiting or adjusting the egress of vapor from the vaporization layer, varying the pore size of the vaporization layer, changing the configuration or arrangement of vaporization layer, varying the number, size and/or location of vapor permeable openings in ejection layer, modulating the amount of vapor released, adjusting the amount of heat provided to the vaporization region, etc. The quantity of heat supplied to the vaporization layer may be varied, for example, by adjusting the power provided an electrical resistive heating element or by modulating the amount of heat returned to the capillary pump from combustion. These parameters may likewise be modified to permit the capillary pump to efficiently vaporize with a variety of different liquids.

In operation of the capillary pump according to the present invention, liquid is drawn through the various pump layers to become vaporized and pressurized. The produced vapor is released and may be used directly or used in other operations, for example, where the capillary pump is one component of a device. The vaporization process may vary depending upon the various layers included in the pump to produce high maximum flow and pressure.

In operation of one particular embodiment, supply liquid is introduced to a liquid supply layer in non-pressurized form and at generally ambient temperature. At a later time, or simultaneous with liquid introduction, a startup heat is provided from an external or internal heat source that may also be self-generating or integrated with the pump. The mechanisms described above with regard to FIGS. 5–8 may be used for the applying heat, where FIG. 5 may be used for start-up heat and FIGS. 6–8 may be used for ignition heat. Heat may also be generated by numerous other mechanisms known in the field of heat production.

As the ejection layer becomes heated, the heat is conveyed to the vaporization layer through a heat transfer portion of the ejection layer, such as through multiple protruding posts. A thermal gradient may be established within the pump layers, with the hottest areas being in proximity to the heat source and vaporization region, and the coolest areas being in proximity to the liquid source, e.g. liquid supply layer. Where an insulation layer is provided, the heat temperature may be kept from migrating toward the liquid supply layer.

Capillary forces draw the liquid through the various layers towards the opening of the ejection layer. The liquid temperature may be raised as it travels through the various layers. For example, the temperature increase may be significant and reach the boiling point of the liquid and especially where a preheat layer is employed. The liquid is drawn by high capillary action through the vaporization layer and hits an area, i.e. vaporization region, that has the combination of pressure balance and vaporization temperature for the liquid. At this point the at least a substantial part of the liquid begins to become vaporized. At times this region may be in the vaporization layer, on the top surface of the vaporization layer and/or in other stacked layers or areas above the vaporization layer and below the ejection layer opening. Where a heat distribution layer is included, substantially even vaporization occurs across the small pores of the heat distribution layer at the point of contact with the vaporization layer or within the vaporization layer.

As vapor is generated, vapor pressure may accumulate within the enclosed space formed by the vapor-impermeable peripheral coating. Vapor is released under pressure through one or more opening. The accumulation of vapor and heat may cause migration of the vaporization region through vaporization layer toward liquid supply layer. Simultaneously, capillary forces draw the liquid into the layers and toward the opening, thus stabilizing the location of the vaporization region. The produced vapor is pressurized within the pump as a consequence of the controlled or controllable egress of vapor from the ejection layer. Pressurization of produced vapor within the enclosed space formed by the vapor coating and subsequent release through one or more openings is generally sufficient to form one or more vapor jet(s) having a pressure greater than the pressure at which the liquid was supplied, and may be sufficient to form one or more vapor jet(s) having a velocity sufficient to entrain and mix with a gas to form a combustible mixture without requiring introduction of energy from an external source or a large or elaborate burner assembly. For most combustion applications, the capillary pump produces a vapor jet having a pressure greater than atmospheric using liquid fuel supplied at atmospheric pressure. The capillary pump of the present invention may alternatively use liquid supplied at a pressure greater than atmospheric to produce a vapor jet at a higher differential pressure.

The capillary pump of the present invention has numerous applications such as combustion devices. In addition, other applications for the capillary pump or the individual various layers used in the capillary pump, include power sources for use in a variety of devices, including absorption refrigerators and other appliances, and thermal to electric conversion systems, such as thermophotovoltaic systems and thermoelectric thermopiles. The pump and/or layers that comprise the pump may also be included in an AMTEC cell system 150 to provide heat for running the system, as shown by one embodiment in FIG. 11. A capillary layer having small-pored layer 152 comprised of ceramic, such as in the vaporization layer, may be sandwiched by a first large-pore ceramic layer 154 at a cool end 158 of the AMTEC cell and a second large-pore ceramic layer 156 an opposing hot end 160 of the cell. The small-pored layer 152 may include a vaporization zone 176 where liquid is converted into vapor. A membrane 162 that is permeable to ions, e.g. alkaline metals, may be in contact or proximal to one surface of the small-pored layer 152 that is towards the hot end 160, so as to provide high-pressure gas for pushing ions through the membrane and change its ionic charge. In one embodiment in an AMTEC cell, the membrane 162 replaces the ejection layer and opening of the pump. The membrane may be an electrolyte material, such as beta alumina. A first coating 164 may surround the periphery of at least the small-pored layer 152 and membrane 162 to permit pressure to build. Furthermore, a dielectric ceramic material 166 may enclose a cycle space 168 for returning atoms 174 that are usually neutral, e.g. potassium, to be recycled and used in further AMTEC cell cycles. In some embodiments, a second coating 170 is provided to surround at least the dielectric ceramic material 166. A solid conductive ceramic shell 172 may also enclose the AMTEC cell at the hot end 160 and/or cool end 158.

Figure 11:
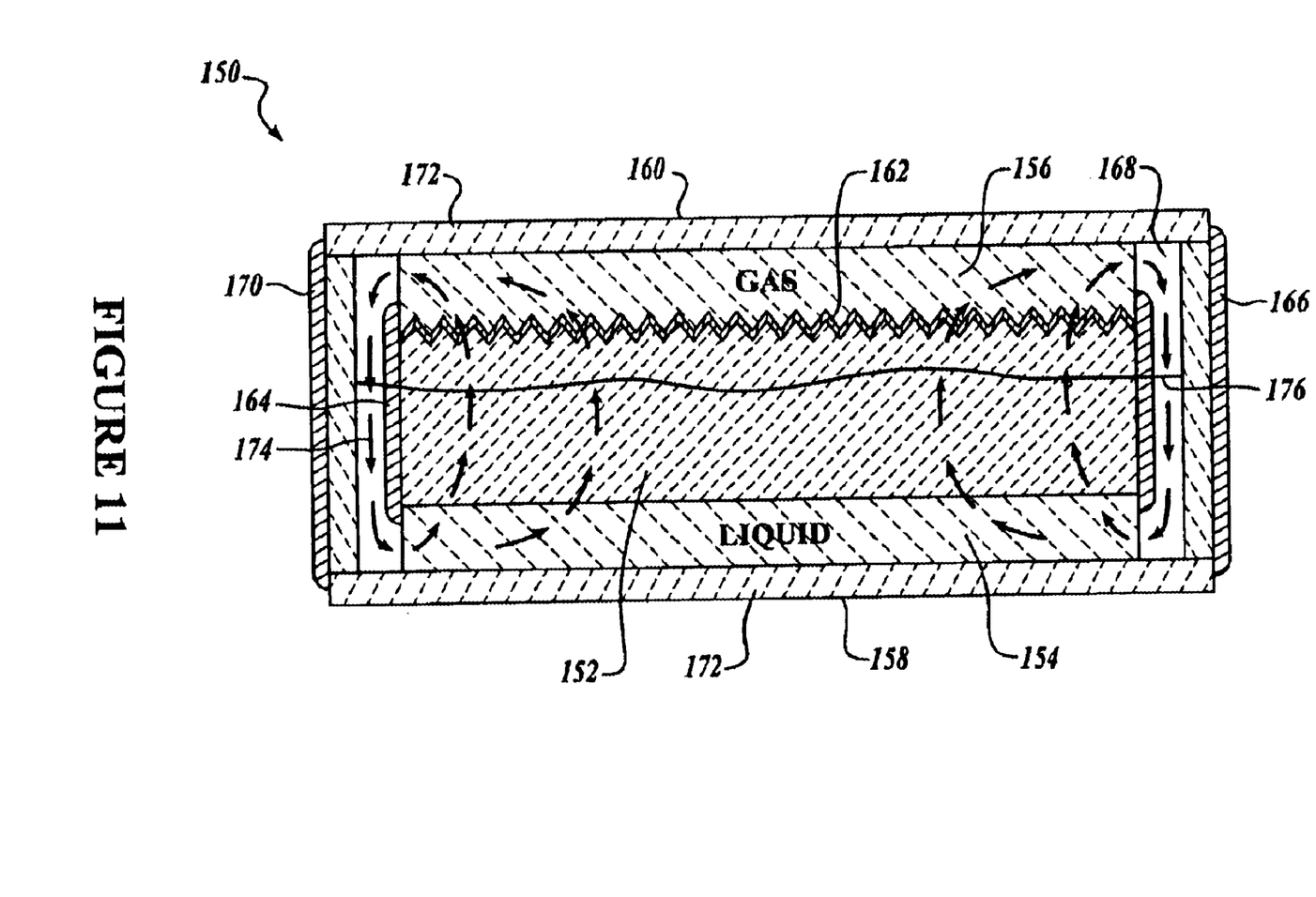
FIG. 11 is a schematic representation of employment of a porous material in an AMTEC cell.

In one method of operation of the AMTEC cell according to the present invention, liquid is vaporized and pressure builds as ions in the vapor, e.g. potassium, is pushed through the membrane. Electrons are stripped off as they move through the membrane. Neutralized atoms are returned to the first large-pore layer to be reused.

In addition, still another application is use with fuel cells, e.g. solid oxide fuel cell, etc., where the pump may provide fuel gas and may flush reaction products from a membrane in the fuel cell. Furthermore, the pump may provide pressurized alcohol vapor directly to a fuel cell membrane, e.g. hydrogen ion fuel cell. In some embodiments, the membrane may be integrated into the capillary pump. The pump may provide heat and, possibly, high-pressure vapor to a reformer for the fuel cell. Furthermore, for convenience, the pump may use the same liquid fuel source as the reformer. The heat of combustion from the fuel cell may also be returned to the capillary pump to drive the continued operation of the pump.

The porous materials that comprise the individual layers, and which may be made according to the processes described below, may be used for a variety of applications in addition to the uses for the capillary pump. For example, such porous materials that are composed of ceramic may be used for filtration or as an electrolyte support in a fuel cell. Porous materials other than ceramic, such as porous metal materials, may be produced by the same methods, and may have utility as electrodes or catalyst support systems.

Furthermore, the capillary pump of the present invention may be used in connection with any device that requires the formation of pressurized vapor from a liquid. Also, a plurality of individual capillary pumps may be incorporated into a device, especially for applications that require higher heat or vapor output than a single pump may provide. In addition, pumps having different capacities or using different types of liquids may be arrayed together for use separately or in combination.

For combustion applications release of vapor under pressure may be at a sufficient velocity to entrain and mix with air and make a clean burning blue flame. For example, the capillary pump may be used in a variety of small fuel burner systems to simplify and improve performance, such as portable heaters, stoves and lamps. Some specific applications include outdoor, camping and marine stoves, portable or installed heaters, lamps for indoor or outdoor use, including mantle lamps, torches, "canned heat" for keeping food or other items warm, "canned light" as a replacement or supplement to candles or other light sources, emergency heat and light "sticks", etc. In some embodiments, combustion may be achieved quickly, for example, within 15 seconds of heating with a flame, and a full capacity output, such as 100 watts, being achieved in less than one minute. A miniature combustion device may be, for example, 0.875 inch in diameter and 3.25 inches in height and have an empty weight of 0.90 ounces.

Various types of liquid source containers having non-pressurized liquid may be associated with the capillary pump. The container may prevent or minimize spillage of liquid fuels from the fuel reservoir, especially where the device is intended to be portable, such as portable heating and lighting applications. For example, a collapsible liquid container may be employed that reduces in size as the liquid is used by the capillary pump. Some embodiments of a container may be made of a material that is transparent or translucent, so that the liquid fuel level is visible to the user. Some types of materials include thermoplastic materials, such as polymeric plastic materials, acrylic, polypropylene, and the like. In addition, the liquid container may be vented to the atmosphere, e.g. include vent(s), to ensure that the pressure within the container is equalized with ambient pressure during operation of the combustion device. Furthermore, a means for refilling the fuel reservoir with liquid fuel may be generally provided. For example, a sealable hole may be provided or wall that is threadedly engageable with or otherwise detachable from the container for refilling the container with liquid.

There may also be various safety features incorporated. In some embodiments of a device that employs the capillary pump, the device remains cool to the touch during operation, other than at a burner component, the heat source, and the thermal path between these components. Often the device may be miniaturized and constructed from lightweight materials and with no moving components. Such device may be produced at a low cost and demonstrate improved reliability. The device may also burn efficiently and "clean," and may not be prone to clogging as a result of oxidation or pyrolosis of the liquid.

One embodiment of a liquid fuel burner device includes in a thermophotovoltaic system to convert thermal energy to electrical energy. The capillary pump may produce thermal energy, which is converted to radiant electromagnetic energy by one or more emitter(s) in thermophotovoltaic cell(s). Some emitters may be ceramic and may be doped with rare earth oxides. Examples of thermophotovoltaic cells include crystalline silicon cells, gallium antimonide (GaSb) infrared-sensitive cells, cells employing germanium, certain Group III–V materials such as gallium indium arsenide, and the like.

There are a variety of different methods in which a capillary pump may be made, as easily discernable to those skilled in the art. While certain steps and materials are described herein, these are exemplary and methods of the making present invention are not limited to these particular embodiments.

In preparing the various porous layers, vapor and liquid phase sintering techniques may be employed for controlled pore size creation. Temperature and pressure may be managed during the sintering processes to avoid reduction in material volume and to increase the pore size. Thus, the starting material, may have very small pores, such as silica aerogel having nanometer size pores, and the pores are enlarged during sintering to the desired size. The starting material may also any material. This sintering process may be employed for any of the porous layers of the pump by varying the sintering schedule and where different starting materials are chosen for their thermal conductivity or other such properties.

In particular, for making the vaporization layer in one method, solids particles having a small and generally uniform average diameter are mixed with a solvent and an appropriate binder. In some instances, the particle size of the raw material solids particles may be smaller than the desired pore size of the finished vaporization layer. Usually, the vaporization layer may be prepared without pore collapse.

Solid particles may be mixed in a mixing apparatus, such as a ball mill, with a solvent or a solvent system to typically uniformly coat the particles. The solvent may be capable of serving as a solvent for a binder under a first set of environmental conditions and that may be capable of changing its solvency as a result of changed environmental conditions, such as by changing temperature or making another change in the environment. Mixing and milling may take place over any period of time, e.g. from several minutes to several hours. A binder is added to typically uniformly coat the particles under conditions in which the solvent system acts as a solvent for the binder. The mixing is performed over a convenient period of time, e.g. from several minutes to several hours to make a typically low viscosity slurry. The solvency of the solvent system may be shifted so that the solvent system is no longer a solvent for the binder and the matrix consequently gels or hardens. One or more environmental condition(s) may be changed to shift the solvency of the solvent system. For example, the matrix may be chilled to shift the solvency of the acetone/methanol solvent system and to provide a gelled, or hardened matrix.

The ternary phase system described above can exploit high pressure $CO_2$ in its gaseous, liquid, and super critical states as a means of shifting a solvent system from solvency to non-solvent. For example, high pressure CO2 may be diffused into the zirconia mix instead of refrigeration to cause gelation. In this manner, the material may go directly from gelation to SFE drying without intermediate handling.

The gelled material may be treated to remove one of the components of a multiple component solvent system. In one embodiment that employs an acetone/methanol solvent system, the gel may be submerged in chilled methanol, and, the acetone component of the solvent system replaced by methanol over a time period, such as over the course of several days. The solvent substitution is typically accompanied by a hardening of the matrix.

The matrix may be further hardened, if needed, and dried, such as by supercritical $CO_2$ solvent replacement. The hardened material may be dried using any suitable means, e.g. by supercritical $CO_2$ solvent replacement, in which, the temperature and pressure of the material retained in the mold in a pressurizable vessel is adjusted to provide a slow transition from liquid to supercritical to gaseous phases. High pressurized $CO_2$ may diffuse into the matrix and thereby shift the solvent system fro solvency to non-solvency.

In one method, the mixture is placed into an open container and exposed to CO2, which causes gelation of the silica particles due to the decrease in pH caused by diffusion of the CO2 into the methanol. The material may then be dried by means including supercritical CO2, possibly in the same enclosure in which the gelation was carried out. The pore size distribution and strength of the material may then be modified by the use of vapor-phase sintering, and may include a temperature gradient in the material so as to produce a graded pore-size distribution.

In any case, $CO_2$ treatment usually produces a change in pH, such as a lowering of pH values to defeat stabilization and permit the formation of a gel. The drying may prevent the simultaneous existence of liquid and gas phases, thereby eliminating capillary action and consequential collapse of pores in the weak material. In one protocol, $CO_2$ continually flows over a significant time period to ensure complete removal of the solvent, e.g. methanol, prior to the transition to the gas phase. A pressure vessel may be used, having at least about 5 times the interior volume of the volume of samples being dried. The vessel may be filled with liquid $CO_2$ and the temperature may be slowly raised over a period of a few hours while releasing pressure to maintain a constant pressure of about 2000 psi. After filling, no additional $CO_2$ may be added to or flowed through the vessel. The temperature may be raised to about 90° C. and venting continued until the pressure is reduced to 0 psi, while maintaining temperature. Yet another technique for drying the hardened matrix includes applying an anti-wetting agent, followed by utilization of conventional drying techniques.

Alternatively, a solvent system may be used where cold liquid $CO_2$ at high pressure is the non-solvent component and is later made supercritical for removal. An exemplary procedure includes mixing cellulose acetate, acetone, and ceramic and pouring the mixture into a mold. The mixture may be slowly pressurized with $CO_2$ at 20° C. to 900 psi. Diffusion of $CO_2$ into the mixture may cause the solvency to shift towards nonsolvency. The temperature and pressure may be held for 8 hours and then the temperature ramped to 90° C. over a 4 hour period while limiting pressure to 2000 psi. The mixture may be slowly vented to atmospheric over a 4 hour period.

The dried material may be sintered to provide the high porosity material at a temperature and time readily determined by one skilled in the art, for example, at 1050° C. for 4 hours for zirconia material. The material may be placed in a silicon carbide box to assist in providing a uniform temperature, and the temperature ramped during heating and cooling cycles. Various sintering techniques may be applicable to the materials used, which may be determined by means of routine experimentation.

The sintered, high porosity material may be abrasive and somewhat powdery. In some embodiments, it may be made into sheets and cut to size, for example, using standard metal cutting equipment, such as saws, lathe tools, milling tools, drills and the like, and with hard blades, such as carbide materials. The high porosity material may be saturated with stearic acid to improve the machining and handling properties. It may be vacuum impregnated with hot, liquid stearic acid, cooled, machined, baked clean at 500° C., and polished flat on both sides with a flat diamond disk operated under running water. The machined and polished pieces may then be dried prior to use.

A block of the sintered vaporization layer material, e.g. zirconia may be placed under vacuum and impregnated with hot liquid stearic acid. The vaporization layer material may be removed from the acid, excess liquid removed and cooled to 25° C. The cooled, impregnated vaporization layer material may be mounted on a flat aluminum plate using molten microcrystalline wax and machined flat by removing about 25% of the material thickness. In addition, circular plugs may be produced using a trepanning tool, e.g. to a depth of 0.150. The material may be remounted with the flat side down, milled to a thickness of 0.135, and the plugs removed upon heating. A circular plug may be baked, for example, at 500° C. for one hour, to remove the stearic acid. The vaporization layer may be polished such as by using a flat diamond disk under running water, and dried in an oven to remove moisture.

The solids particles, the solvent or solvent mix, and the binder may be selected depending upon, inter alia, the desired properties of the produced material and affinity for the desired solids particles. The volumetric ratio of solids to binder may be any, desired amount, e.g. from about 5:1 to about 1:1 and more often about 1.5:1. An example of the volumetric ratio of liquid to solids in the solids/solvent/binder mixture is from about 30:1 to about 2:1, more often about 20:1.

One type of binder may be cellulose acetate, for example, with zirconia ceramic particles. The solvent system may be a single component solvent or a solvent mix. Acetone/methanol may be an appropriate solvent system for use with a cellulose acetate binder added at a ratio of acetone to methanol in which the organic solvent system is barely a solvent for the binder at a first environmental condition, e.g., ambient temperature. Other solvent systems may include acetone and various alcohol components (methanol, ethanol, isopropyl alcohol, etc. for cellulose acetate binders); methanol, ethanol, acetone, etc. for cellulose nitrate binders; amine solvents and kerosene for polypropylene or polyethylene; and numerous other suitable binders and solvent systems that are known or may become known in the art.

The ejection layer with heat transfer portion may be produced by methods that use a variety of materials, such as alumina or silicon carbide. In one embodiment of ejection layer, one surface has molded posts, which may be any shape, such as square. The integration of this heat transfer portion may provide a significantly low viscous vapor flow loss as well as providing simplicity in architecture of the capillary pump, compared to pumps that have separate member for heat transfer and vapor release.

One method of making the ejection layer uses gel-casting, which may include techniques using resorcinol and formaldehyde or other such formaldehyde type polymeric reaction that are known in the art. A machined model for the ejection layer may be placed, pattern side-up, into a temperature controlled vacuum chamber. The chamber may be evacuated and silicon rubber, or similar material, may be injected into the chamber. The temperature may be increased to about 100° C. for a convenient period of time to cure, e.g. one hour. The temperature may be decreased, such as to ambient temperature. The model may be removed from the mold.

A ceramic slurry, such as a mixture of A16-SG alumina, coarse alumina, formaldehyde with methanol and water may be mixed, such as in a ball mill device for about one hour. A second ceramic slurry, such as a mixture of A16-SG alumina, coarse alumina, resorcinol, sodium hydroxide, Darvan #7 (such as from Leslie Supply Co.) and water may also be mixed in a similar manner for about one hour. Equal part of the two slurries may be mixed and dispensed into a silicone mold. The mold may be placed into a pressure-controlled vessel. The pressure may be quickly increased to 100 PSI and the temperature increased to about 65° C. over about a five minute period. The pressure may be decreased after about 20 minutes to 25 PSI over about a sixty-five minute period. Thereafter, the temperature may be quickly changed to ambient and pressure may be decreased to ambient at the same rate as before. The material may be dried until it is slightly white in color at ambient conditions. The material may be frozen at −20° C. for about 10 minutes and removed from the mold to be dried at ambient conditions.

The material may be prepared for sintering by placing the material in a silicon carbide box, with the pattern-side facing up. The material may be sintered at, for example, 1300° C. for thirty minutes. Wax may be used to fasten the pattern side facing down in order to polish the layer surface. Excess material may be ground off, the wax removed, such as with hot kerosene, and the material cleaned, such as with ultrasonic solvent cleaner.

In order sinter the material, the material may be placed on a silicon carbide shelf and fired, for example, according to a firing schedule. Both sides of the material may then be inked and the patterned side polished until the ink is removed from the raised surfaces. The layer may be polished again until the opening has about a 1:1 aspect ratio and the surface is substantially flat. The organics materials may be burned off, e.g. at about 700° C. and the layer cleaned by ultrasonic methods in soapy water.

In various embodiments of the capillary pump, other components may be integrated with the ejection layer. For example, the ejection layer may be made with integrated valves, flow controls, pressure gauges and controls, temperature monitors, heaters, sensing or control circuitry, start-up or preheat pumps, etc., by various procedures, such as silicon wafer technology, known by those skilled in the art.

One embodiment of the liquid supply layer may be fabricated from alumina grindstone. The material may be roughly cut into discs or other desired shapes, such as with a diamond saw, and dried at 500° C. The cut material may be vacuum impregnated with epoxy to prevent damaging the diamond polishing wheel and mounted on a mandrel for grinding and cutting. The discs may be ground on a lathe with high speed diamond tools to a desired size, e.g. diameter of 0.500 inch. Liquid feed disks may be cut from a rod of material to any thickness, e.g. 0.165 inch. A small diameter longitudinal bore may be cut into the remaining portion of the rod and heat transfer member discs having a central bore or opening may be cut off the remainder of the rod, for example, to a thickness of 0.050 inch. Both liquid feed discs and heat transfer member discs may be polished flat on a diamond disk and heated to burn out the epoxy, e.g. at 500° C. for one hour.

Optionally, the various layers of the capillary pump may be treated, e.g. covered with a chemical composition, to produce selective properties on the layer surfaces. For example, the surfaces may be processed to repel silicone greases or waxes, which may otherwise adhere to the pores and render the pores hydrophobic.

For the coating, a low thermal conductivity glaze that is impermeable to liquids and gases may be formulated to coat peripheral edges of the capillary pump and to hold the components together. For example, the glaze may be made by mixing 100 g Ferro flit 3195, 2 g boric acid, 2 g red food coloring and 200 g methanol in a ball mill and grinding for two hours. The slurry may be dried in a double boiler, followed by complete drying in an oven. A "small CN mix" may be made by mixing 10 g cellulose nitrate (Aldrich, 43,508-2) with 60 g amyl acetate. A "big CN mix" may be made by mixing 3 g cellulose nitrate (Aldrich 43,505-8) with 60 g amyl acetate. Both formulations may be thoroughly mixed and allowed to stand overnight. The resulting dry powder, e.g. 15.64 g, may be mixed with amyl acetate, e.g. 20 g, and ground with a mortar and pestle. The big CN mix, e.g. 5.75 g and small CN mix, e.g. 5.75 g may be also mixed with the mixture.

Assembly of the capillary pump may include aligning a heat transfer member element, vaporization layer disc and liquid feed disc in free rotation fixture in a lathe under light pressure. The assembly may be spun at low speed and one or more coats, e.g. three coats, of the glaze glass may be applied to the cylindrical exterior surface of the aligned components of the capillary pump. The glaze may be applied slightly over the, end edges and hot air directed to the assembly to assist in drying. The glazed assembly may be baked in a furnace, e.g. at 800° C. for 5 minutes. The ejection layer may be joined to this assembly, for example, by applying a small amount of glaze glass at the joint only and baking at 800° C. for 5 minutes. The assembly may also be vacuum impregnated with Silane mix and dried at 75° C. for 3 hours.

One embodiment of a capillary pump produced by these methods may have various sizes, such as from 0.2 to 0.8 inch in diameter and are 0.4 inch in height. An exemplary capillary pump that has a diameter of 0.5 inch may produce vapor at flow rates of 1.35 grams of fuel per minute. In general, the flow rate may be proportional to the cross-sectional surface area of the pump.

The present invention has been described above in varied detail by reference to particular embodiments and figures. However, these specifics should not be construed as limitations on the scope of the invention, but merely as illustrations of some of the present embodiments. It is to be further understood that other modifications or substitutions may be made to the described the capillary pump, as well as methods of its use without departing from the broad scope of the invention. Therefore, the following claims and their legal equivalents should determine the scope of the invention.

We claim:

1. A stacked capillary pump to produce pressurized vapor, comprising:

a vaporization layer to form vapor from liquid, the vaporization layer having capillary-sized pores, the vaporization layer further having a thickness and area sufficient to reduce viscous drag of flowing liquid and vapor;

an ejection layer having one or more openings to permit release of pressurized vapor, the ejection layer including a porous or channeled heat transfer portion proximal toward the vaporization layer to convey heat toward the vaporization layer;

a porous insulation layer to shield the liquid in a supply area from the heat, prior to the liquid entering the vaporization layer; and a coating at least partially surrounding the vaporization pump to block fluid leakage and allow vapor pressure to increase.

2. The capillary pump of claim 1, wherein the pores or channels of the heat transfer portion are formed by multiple posts protruding toward the vaporization layer.

3. The capillary pump of claim 1, further including a heat distribution layer having smaller pores than the pores or channels of the heat transfer portion, to permit substantially even distribution of heat.

4. The capillary pump of claim 1, wherein the ejection layer creates heat for the vaporization region.

5. The capillary pump of claim 4, wherein the ejection layer is integrated with a thick film electrical heater.

6. The capillary pump of claim 4, wherein the ejection layer comprises an electrically conductive material.

7. The capillary pump of claim 1, wherein at least one of the one or more opening(s) is a variable opening.

8. The capillary pump of claim 7, wherein the at least one variable opening includes at least one slot in a flexible plate.

9. The capillary pump of claim 7, further including a moveable plate to at least partially uncover the at least one variable opening.

10. A The capillary pump of claim 1, further including a chemically reactive substance to create heat upon contact with an added substance.

11. The capillary pump of claim 10, wherein the chemically reactive substance includes lithium bromide and the added substance is aqueous.

12. The capillary pump of claim 1, further including an energy converter to generate a heat or electricity from the released pressurized vapor.

13. The capillary pump of claim 1, wherein heat is generated from the released pressurized vapor and stored as electricity by a thermal-to-electric energy converter.

14. The capillary pump of claim 13, wherein the thermial-to-electric energy converter comprises a thermophotovoltaic system, an alkali metal thermal to electric conversion system, or a fuel cell.

15. The capillary pump of claim 13, wherein the stored electricity is used to provide heat to further operations of the capillary pump.

16. A stacked capillary pump to produce pressurized vapor, comprising:

a vaporization layer to form vapor from liquid, the vaporization layer having capillary-sized pores, the vaporization layer further having a thickness and area sufficient to reduce viscous drag of flowing liquid and vapor;

an ejection layer including a porous or channeled heat transfer portion proximal to the vaporization layer to convey heat toward the vaporization layer, the ejection layer having one or more openings to permit release of pressurized vapor;

a porous preheat layer to raise the temperature of the liquid prior to the liquid entering the vaporization layer; and a coating at least partially surrounding the vaporization pump to block fluid leakage and allow vapor pressure to increase.

17. The capillary pump of claim 16, wherein the pores or channels of the heat transfer portion are formed by multiple posts protruding toward the vaporization layer.

18. The capillary pump of claim 16, further including a heat distribution layer having smaller pores than the pores or channels of the heat transfer portion, to permit substantially even distribution of heat.

19. The capillary pump of claim 16, wherein the ejection layer creates heat for the vaporization region.

20. The capillary pump of claim 19, wherein the ejection layer is integrated with a thick film electrical heater.

21. The capillary pump of claim 19, wherein the ejection layer comprises an electrically conductive material.

22. The capillary pump of claim 16, wherein at least one of the one or more opening(s) is a variable opening.

23. The capillary pump of claim 22, wherein the at least one variable opening includes at least one slot in a flexible plate.

24. The capillary pump of claim 22, further including a moveable plate to at least partially uncover the at least one variable opening.

25. The capillary pump of claim 16, further including a chemically reactive substance to create heat upon contact with an added substance.

26. The capillary pump of claim 25, wherein the chemically reactive substance includes lithium bromide and the added substance is aqueous.

27. The capillary pump of claim 16, further including an energy converter to generate a heat or electricity from the released pressurized vapor.

28. The capillary pump of claim 16, further including a porous insulation layer to shield the liquid in a supply area from the heat, prior to the liquid entering the vaporization layer.

29. The capillary pump of claim 16, wherein heat is generated from the released pressurized vapor and stored as electricity by a thermal-to-electric energy converter.

30. The capillary pump of claim 29, wherein the thermal-to-electric energy converter comprises a thermophotovoltaic system, an alkali metal thermal to electric conversion system, or a fuel cell.

31. The capillary pump of claim 29, wherein the stored electricity is used to provide heat to further operations of the capillary pump.

* * * * *